United States Patent
Bandyopadhyay (10) Patent No.: US 9,411,837 B2
(45) Date of Patent: Aug. 9, 2016

(54) SYSTEM AND METHOD FOR OPTIMIZING MEMORY UTILIZATION IN A DATABASE

(71) Applicant: Tata Consultancy Services Limited, Mumbai (IN)

(72) Inventor: Avinandan Bandyopadhyay, Kolkata (IN)

(73) Assignee: Tata Consultancy Services Limited (IN)

( * ) Notice: Subject to any disclaimer, the term of this patent is extended or adjusted under 35 U.S.C. 154(b) by 338 days.

(21) Appl. No.: 14/195,342

(22) Filed: Mar. 3, 2014

(65) Prior Publication Data
US 2015/0178334 A1 Jun. 25, 2015

(30) Foreign Application Priority Data
Dec. 23, 2013 (IN) .......................... 4013/MUM/2013

(51) Int. Cl.
*G06F 17/30* (2006.01)
(52) U.S. Cl.
CPC .... *G06F 17/30312* (2013.01); *G06F 17/30286* (2013.01)
(58) Field of Classification Search
None
See application file for complete search history.

(56) References Cited

U.S. PATENT DOCUMENTS

| | | | |
|---|---|---|---|
| 6,560,615 B1 | 5/2003 | Zayas et al. | |
| 8,051,039 B2 | 11/2011 | Barrett-Lennard | |
| 8,442,947 B2 | 5/2013 | Veres et al. | |
| 2011/0047084 A1* | 2/2011 | Manzalini | G06F 9/505 705/301 |
| 2012/0089577 A1* | 4/2012 | Beier | G06F 17/30551 707/687 |
| 2013/0097604 A1* | 4/2013 | Simitsis | G06F 9/46 718/100 |

OTHER PUBLICATIONS

Weil, Sage, Technical Report UCSC-SSRC-04-01,"Scalable Archival Data and Metadata Management in Object-Based File Systems," Jun. 2004 (12 pages).

* cited by examiner

*Primary Examiner* — Belix M Ortiz Ditren
(74) *Attorney, Agent, or Firm* — Finnegan, Henderson, Farabow, Garrett & Dunner, LLP (57) ABSTRACT

The present disclosure generally relates to database management and, more particularly, to systems and methods for optimizing memory utilization of the database. In one embodiment, a method for optimizing memory utilization in a database is disclosed. The method comprises designating a first quantitative value of the plurality of quantitative values as a first epoch associated with a first tuple; determining a first difference between a second quantitative value of the plurality of quantitative values and the first epoch; storing the first difference as a second delta value associated with a second tuple when an absolute value of the first difference is less than a threshold; designating the second quantitative value as a second epoch associated with the second tuple when the absolute value of the first difference is greater than or equal to the threshold; and generating a master tuple.

17 Claims, 9 Drawing Sheets

SYSTEM AND METHOD FOR OPTIMIZING MEMORY UTILIZATION IN A DATABASE

PRIORITY CLAIM

This U.S. patent application claims priority under 35 U.S.C. §119 to India Application No. 4013/MUM/2013, filed Dec. 23, 2013. The aforementioned application is incorporated herein by reference in its entirety.

TECHNICAL FIELD

The present disclosure generally relates to database management and, more particularly, to systems and methods for optimizing memory utilization of the database.

BACKGROUND

Providing databases are a common mechanism for storing and managing information in the form of data. In today's information technology (IT) environment, the amount of the data is increasing every day. As a result, managing the increasing amount of data in a database becomes a challenge in database management systems. The data stored in the databases may be used for performing informative analysis. For example, during performance monitoring, a large amount of data may be required for performing analyses such as a trend analysis, a prediction analysis, and other types of data analysis. While performing such analyses, the large amount of data flowing across a network in the IT environment may be required to be securely stored and managed in the databases. In terms of the performance monitoring, the data may include, for example, a number of processes that are active at any point, Central Processing Unit (CPU) utilization, free virtual memory, and other types of monitoring data.

Sometimes, the amount of data may be in the gigabytes (GBs) and terabytes (TBs) range, or in a higher range. Moreover, the data may be continuously received in the databases from various sources. Thus, managing such continuous data in the database in real time becomes another challenge. Data occupies storage spaces in terms of bits and bytes, and a storage space crunch situation may result in the databases where there are large amount data continuously being received. Thus, it may be required to optimize the memory utilization of the databases for storing maximum data without compromising the data integrity.

SUMMARY

This summary is provided to introduce aspects related to systems and methods for optimizing memory utilization in a database and the concepts are further described below in the detailed description. This summary is not intended to identify essential features of the claimed subject matter nor is it intended for use in determining or limiting the scope of the claimed subject matter.

In one embodiment, a method for optimizing memory utilization in a database capable of storing a plurality of quantitative values is provided. The method may comprise designating, by one or more processors executing programmed instructions stored in a memory, a first quantitative value of the plurality of quantitative values as a first epoch associated with a first tuple. The first tuple may further comprise a first delta value. The method may further comprise determining, by the one or more processors, a first difference between a second quantitative value of the plurality of quantitative values and the first epoch, and storing, by the one or more processors, the first difference as a second delta value associated with a second tuple if an absolute value of the first difference is less than a threshold. The second tuple may correspond to the second quantitative value. The method may further comprise designating the second quantitative value as a second epoch associated with the second tuple if the absolute value of the first difference is greater than or equal to the threshold, and generating a master tuple based on the first tuple and the second tuple. The master tuple may be stored in the database.

In one embodiment, a system for optimizing memory utilization in a database capable of storing a plurality of quantitative values is provided. The system may comprise one or more processors and a memory storing processor-executable instructions that, when executed by the one or more processors, configure the one or more processors to designate a first quantitative value of the plurality of quantitative values as a first epoch associated with a first tuple. The first tuple may further comprise a first delta value. The system may further comprise instructions to configure the one or more processors to determine a first difference between a second quantitative value of the plurality of quantitative values and the first epoch, and store the first difference as a second delta value associated with a second tuple if an absolute value of the first difference is less than a threshold. The second tuple may correspond to the second quantitative value. The system may further comprise instructions to configure the one or more processors to designate the second quantitative value as a second epoch associated with the second tuple if the absolute value of the first difference is greater than or equal to the threshold, and generate a master tuple based on the first tuple and the second tuple. The master tuple may be stored in the database.

In one embodiment, a non-transitory computer program product having embodied thereon computer program instructions for optimizing memory utilization in a database capable of storing a plurality of quantitative values is provided. The computer program instructions may comprise instructions for configuring a processor to perform operations comprising designating a first quantitative value of the plurality of quantitative values as a first epoch associated with a first tuple. The first tuple may further comprise a first delta value. The computer program instructions may further comprise instructions for configuring a processor to perform operations comprising determining a first difference between a second quantitative value of the plurality of quantitative values and the first epoch, and storing the first difference as a second delta value associated with a second tuple if an absolute value of the first difference is less than a threshold. The second tuple may correspond to the second quantitative value. The computer program instructions may comprise instructions for configuring a processor to perform operations comprising designating the second quantitative value as a second epoch associated with the second tuple if the absolute value of the first difference is greater than or equal to the threshold, and generating a master tuple based on the first tuple and the second tuple. The master tuple may be stored in the database.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Systems and methods for optimizing memory utilization in a database are described. The database may be capable of storing and managing the flow of a large amount of data across a network. Due to the large amount of the data, a space crunch situation may be created in the database. For managing such a space crunch situation, the present disclosure provides an exemplary mechanism for storing one or more delta values instead of the data. To achieve the purpose of memory utilization in the database, a threshold may be defined for comparing and storing data-set streaming into the database. Further, according to one or more exemplary embodiments of the present disclosure, the threshold may be a predefined value. According to some aspects of the present disclosure, a first data of the data-set may be set as a first epoch. Upon setting the first epoch, the remaining data of the data-set that may be streamed into the database after the streaming of the first data may be compared with the first epoch. The comparison may be performed for determining a difference between the content of the remaining data with that of the first epoch.

Based on the comparison, if an absolute value of the difference is determined to be lesser than the threshold, the difference may be stored in a tuple associated with the data (e.g., the data which is compared with the first epoch). Further, if the absolute value of the difference is determined to be equal or greater than the threshold, the data may be designated as a next epoch. The comparison may be performed for each data of the remaining data that may be streamed into the database. Also, at each comparison, a tuple may be created for each data of the data-set. The tuple created may comprise the difference (e.g., a delta value), a reference (e.g., an epoch), and a time-stamp. Thus, after the comparison is performed, a plurality of tuples may be created. The plurality of tuples may be further processed for optimizing the database.

In order to further optimize the database, the plurality of tuples may be compared with one another. According to some aspects of present subject matter, each tuple of the plurality of tuples may be compared with its successive tuple. During the comparison, the difference (e.g., a delta value) and the reference (e.g., an epoch) of two successive tuples may be compared. If no difference is determined between the delta values and the epochs of the two successive tuples, the next successive tuples of the plurality of tuples may be compared. Further, if the difference is found between the delta values and/or the epochs of the next successive tuples, a master tuple may be created and stored in the database. The master tuple created may enable the optimization of the memory utilization of the database by avoiding the storing of repeated values in the database. According to some embodiments of present subject matter, two successive tuples may be chosen sequentially or randomly from the plurality of tuples for comparison.

While aspects of described system and method for optimizing memory utilization in a database may be implemented in any number of different computing systems, environments, and/or configurations, the embodiments are described in the context of the following exemplary system.

Figure 1:
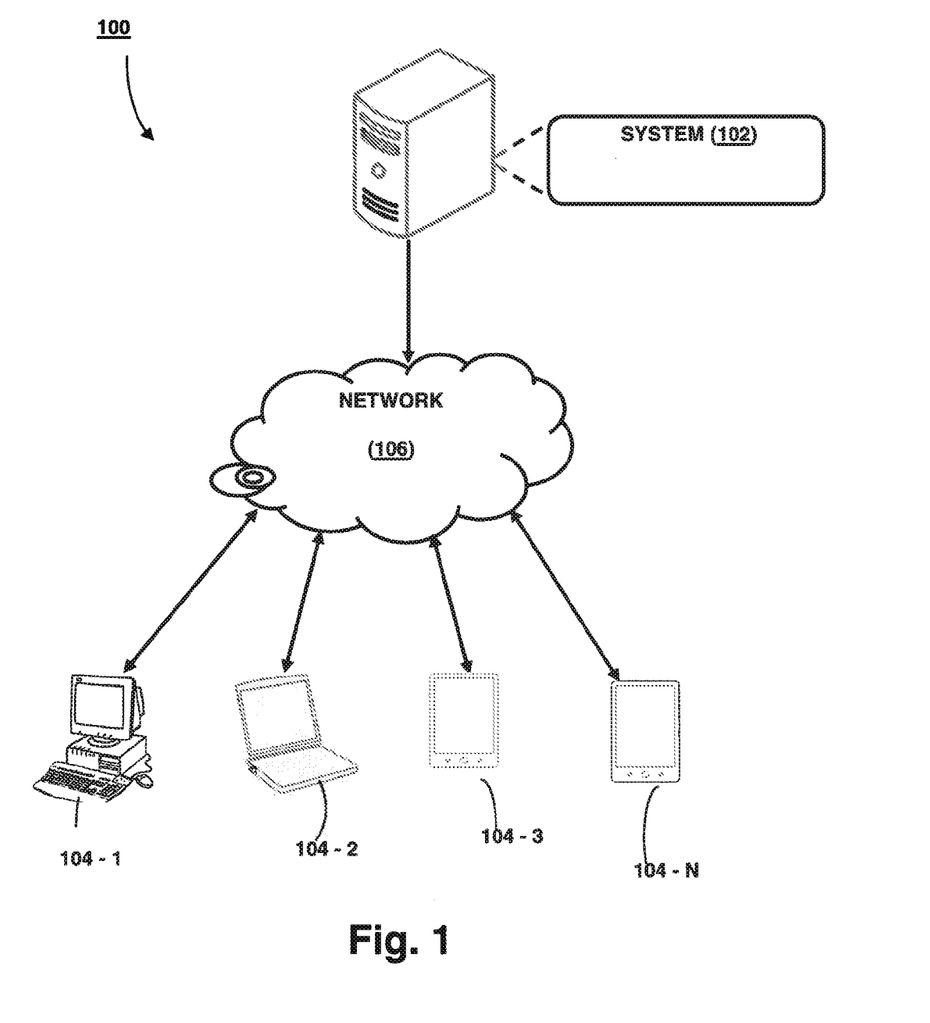
FIG. 1 illustrates an exemplary network environment including a system for optimizing memory utilization in a database, in accordance with an embodiment of the present subject matter.

FIG. 1 illustrates an exemplary network environment 100 that includes a system 102 for optimizing memory utilization in a database, in accordance with an embodiment of the present subject matter. The database may be capable of storing a plurality of quantitative values. In one embodiment, the system 102 may designate a first quantitative value of the plurality of quantitative values as a first epoch. In one embodiment, the system 102 may define a threshold for comparing the remaining quantitative values with the first epoch. The remaining quantitative values exclude the first quantitative value designated as the first epoch. In one embodiment, the system 102 may provide comparison of the remaining quantitative values with the first epoch to determine a difference. Based on the comparison, the system 102 may store the difference as a delta value when an absolute value of the difference is determined to be lesser than the threshold.

According to some embodiments of present subject matter, during the comparison of the remaining quantitative values with the first epoch, the absolute value of the difference may be considered instead of the difference itself. In some embodiments, during the storing of the difference as the delta value in the tuple, the difference itself may be considered instead of the absolute value of the difference. Further, the system 102 may be configured to designate a quantitative value of the remaining quantitative value as a next epoch, if the absolute value of the difference is determined to be equal to or greater than a threshold. In some embodiments, for each comparison, a tuple may be created for each quantitative value of the plurality of quantitative values. The tuple may comprise the differences that are determined as a delta value, a reference such as the epoch, and a time stamp. Thus, based on the comparison, a plurality of tuples may be created corresponding to the plurality of quantitative values.

According to some embodiments of present subject matter, the system 102 may further provide comparison of the plurality of tuples with one another. For example, the system 102 may provide comparison of two successive tuples of the plurality of tuples with each other. The comparison may be performed to determine difference between the delta values and the epochs of the two successive tuples. Further, if the difference is found between the delta values and/or the epochs of the two successive tuples during comparison, a master tuple may be created and stored in the database. Once the master tuple is created, the plurality of tuples may be deleted from the database. The master tuple may facilitate optimizing the memory utilization of the database by avoiding the storing of repeated values into the database.

Although the present subject matter is explained using the system 102 that is implemented on a server, it is appreciated that the system 102 may also be implemented in a variety of computing systems, such as a laptop computer, a desktop computer, a notebook, a workstation, a mainframe computer, a server, a network server, etc. In one embodiment, the system 102 may be implemented in a cloud-based environment. It is further appreciated that the system 102 may be accessed by multiple users through one or more user devices 104-1, 104-2, . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one embodiment, the network 106 may be a wireless network, a wired network, or a combination thereof. The network 106 can be implemented as one of the different types of networks, such as intranet, local area network (LAN), wide area network (WAN), the Internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including routers, bridges, servers, computing devices, storage devices, etc.

Figure 2:
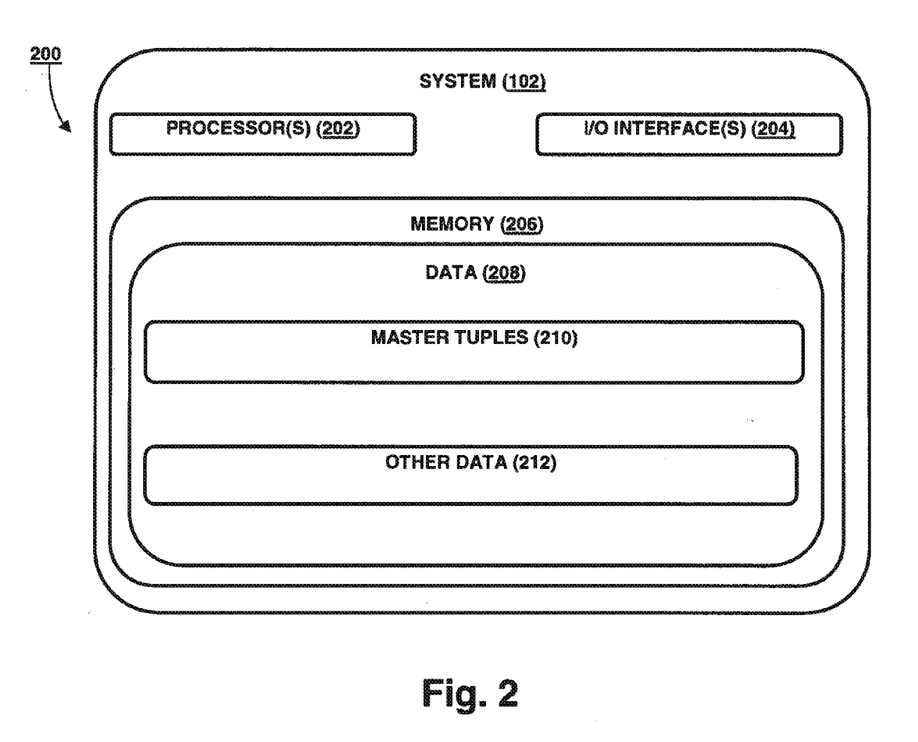
FIG. 2 illustrates an exemplary system for optimizing memory utilization in a database, in accordance with an embodiment of the present subject matter.

Referring now to FIG. 2, the system 102 is illustrated in accordance with an embodiment of the present subject matter. In one embodiment, the system 102 may include one or more processors 202, an input/output (I/O) interface 204, and a memory 206. The one or more processors 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, etc. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks (e.g., LAN, cable networks, etc.) and wireless networks (e.g., WLAN, cellular networks, and/or satellite networks). The I/O interface 204 may include one or more ports for connecting a number of devices to one another or to another server.

The memory 206 may include any non-transitory computer-readable medium including, for example, volatile memory (e.g., static random access memory (SRAM) and dynamic random access memory (DRAM)), and/or non-volatile memory (e.g., read only memory (ROM), erasable programmable ROM, flash memories, hard disks, optical disks, and magnetic tapes). The memory 206 may include data 208.

The data 208 may serve as a repository for storing data processed, received, and/or generated by the processor 202. The data 208 may also include master tuples 210 and other data 212. The other data 212 may include, for example, data generated as a result of the execution of the one or more processors 202.

In one embodiment, a user may use the user device 104 to access the system 102 via the I/O interface 204. The user may register, via the I/O interface 204, to use the system 102. The operation of the system 102 may be further explained below in connection with FIGS. 3, 4, 5, and 6. The system 102 may be used for optimizing memory utilization in a database.

Figure 3:
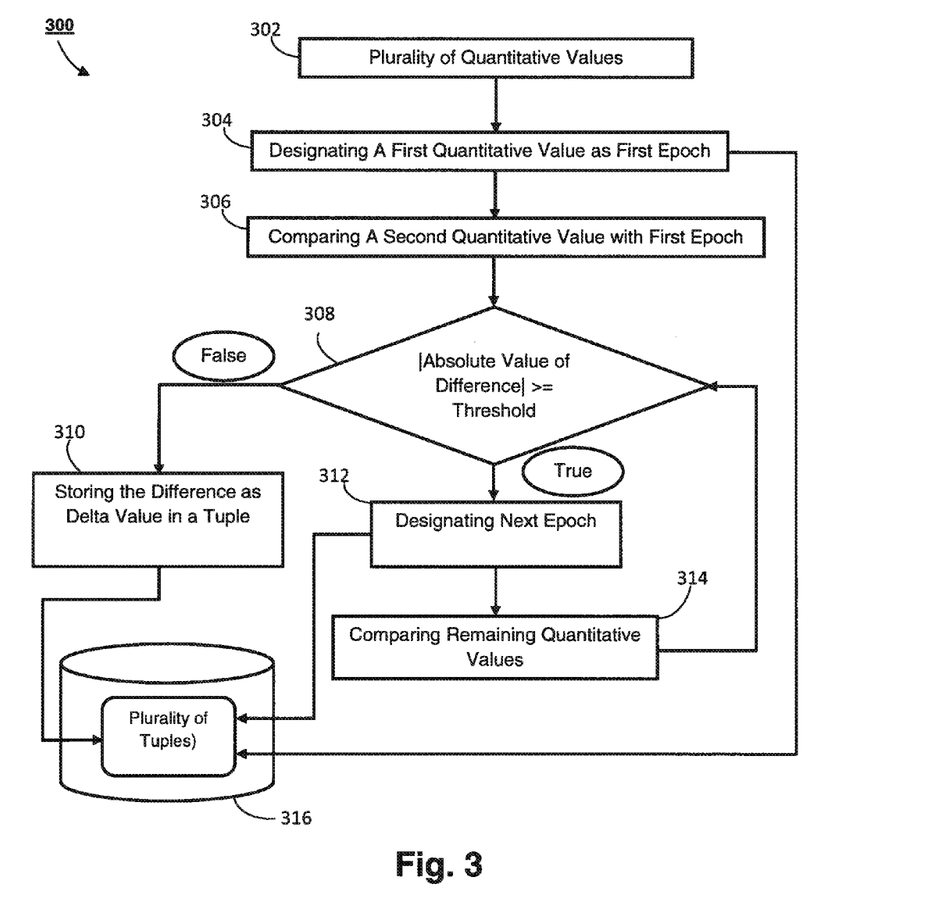
FIG. 3 is a flowchart illustrating an exemplary method for optimizing memory utilization in a database, in accordance with an embodiment of the present subject matter.
Figure 4:
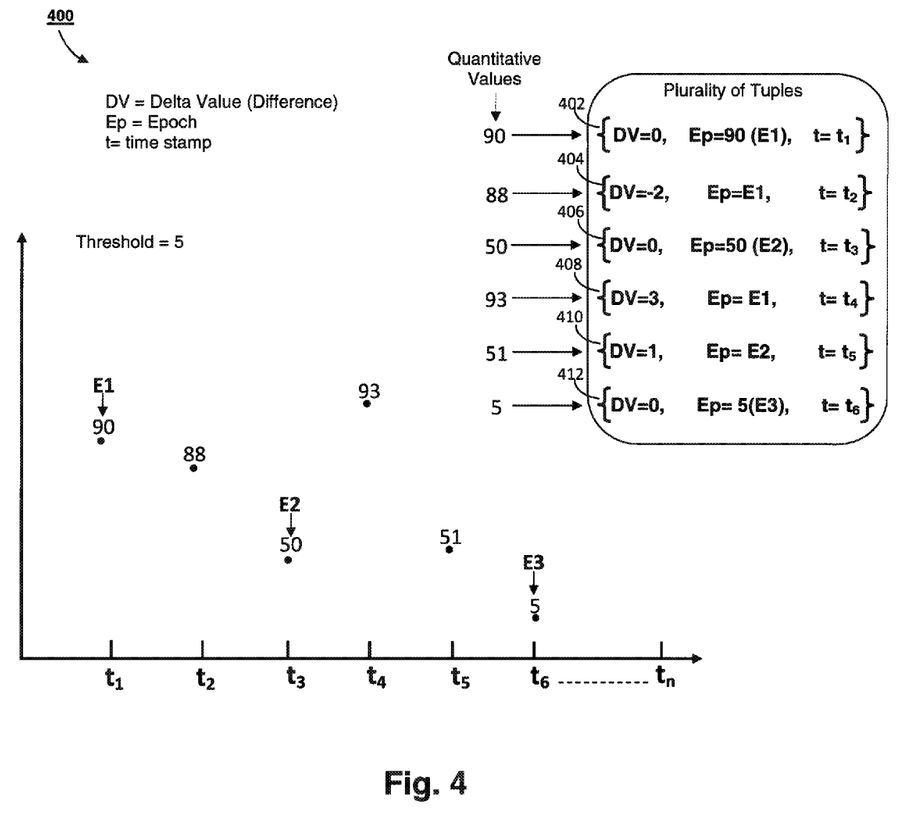
FIG. 4 is a diagram illustrating an exemplary operation of the system for optimizing memory utilization in a database, in accordance with an embodiment of the present subject matter.

FIG. 3 is a flowchart illustrating an exemplary method 300 for optimizing memory utilization in a database, in accordance with an embodiment of the present subject matter. FIG. 4 is a diagram 400 illustrating an exemplary operation of the system for optimizing memory utilization in a database, in accordance with an embodiment of the present subject matter. In one embodiment, the system 102 may be provided for optimizing memory utilization in a database 316. Database 316 may be capable of storing a plurality of quantitative values (step 302). According to an exemplary embodiment of present subject matter, the plurality of quantitative values may be {90, 88, 50, 93, 51, and 5}, as shown in FIG. 4. At step 304, a first quantitative value (e.g., 90) of the plurality of quantitative values may be designated as a first epoch (e.g., E1). Further, in some embodiments, the plurality of quantitative values may be associated with a plurality of tuples in such a manner that each quantitative value has a corresponding tuple. Each tuple may comprise a delta value (DV), an epoch (Ep), and a time-stamp (t). For example, the tuple 402 (tuple T1) of the plurality of tuples may correspond to the first quantitative value (e.g., 90). The tuple 402 may comprise, for example, a delta value=0, an epoch (e.g., Ep=90), and a time stamp $t=t_1$.

Further, in the next step 306, a second quantitative value (e.g., 88) of the plurality of quantitative values may be compared with the first epoch E1 (i.e., 90). For comparing the second quantitative value, a threshold may be defined. In the present scenario, the threshold may be defined as, for example, "5". After defining the threshold as "5", the comparison may be performed for determining a difference D1, i.e., the difference between the second quantitative value (i.e. 88) and the first epoch E1 (i.e., 90).

At step 308, the difference D1 may be determined based on the comparison of the second quantitative value (e.g., "88") and the first epoch (e.g., "90"). As shown in FIG. 4, the difference D1 may be determined to be "−2" (i.e., the difference between 88 and 90 is −2). According to some embodiments of present subject matter, if an absolute value of the difference is lesser than the threshold, the difference may be stored as a delta value of the corresponding tuple of the quantitative value.

At step 310, if the absolute value of the difference D1 (e.g., 2) is lesser than the threshold (e.g., 5), the difference D1 may be stored as a delta value (DV) in a tuple (tuple 404, or tuple T2) corresponding to the second quantitative value (e.g., 88). Therefore, at the tuple 404, which may correspond to the second quantitative value, the difference D1 may be stored as a delta value (e.g., DV=−2), an epoch as E1, and a time stamp t as $t_2$. As a result, tuple T2={DV=−2, Ep=E1, $t=t_2$}. In this example, the epoch for the second quantitative value is stored as E1 (e.g., the first epoch) because the absolute value of the difference D1 is determined to be less than the threshold when the second quantitative value is compared with the first epoch E1. Further, according to another embodiment of present subject matter, the second quantitative value may be designated as a next epoch (e.g., a second epoch) if the absolute value of the difference D1 is determined to be equal to or greater than the threshold value. In the above example, the absolute value of the difference D (e.g., −2) is lesser than the threshold. As a result, the difference D1 (e.g., −2) is stored in the tuple T2 associated with the second quantitative value.

According to one embodiment of the present subject matter, if the condition at the step 308 is not satisfied (i.e., if the absolute value of the difference is determined to be lesser than the threshold), the remaining quantitative values of the plurality of quantitative values may be compared with the first epoch E1. The remaining quantitative values may exclude the first quantitative value and the second quantitative value (e.g., 90 and 88 respectively). Based on the comparison of the remaining quantitative values with the first epoch E1, differences D2 to Dn may be determined. A difference Dn may be an indication of a variation between the nth quantitative value and the first epoch E1. According to some embodiments of present subject matter, the plurality of quantitative values may be streamed into the database 316 in real-time. Further, the differences D2 to Dn may be stored as delta values (DV) in tuples corresponding to the remaining quantitative values if the absolute values of the differences D2 to Dn are less than the threshold.

Further, according to some embodiments of the present subject matter, if the condition at the step 308 is satisfied (i.e., if the absolute value of difference is determined to be equal to or greater than the threshold), the remaining quantitative values are compared with the first epoch E1 and the second epoch E2. Based on the comparison of the remaining quantitative values with the first epoch E1 and the second epoch E2, a first difference and a second difference may be determined. Based on the first difference and the second difference determined, any one or more of the following steps may be performed: storing the first difference as a delta value in a tuple Tn corresponding to a quantitative value Qn of the remaining quantitative values if the absolute value of the first difference is less than the threshold and less than an absolute value of the second difference; storing the second difference as a delta value in a tuple Tn corresponding to a quantitative value Qn of the remaining quantitative values if the absolute value of the second difference is less than the threshold and less than the absolute value of the first difference; or designating a quantitative value of the remaining quantitative values as a next epoch if the absolute value of the first difference and the absolute value of the second difference are equal to or greater than the threshold.

As a result, in some embodiments, at step 314, the remaining quantitative values of the plurality of quantitative values may be compared. As an example, as shown in FIG. 4, the remaining quantitative values may comprise {50, 93, 51, and 51}. In the next step, each of the remaining quantitative values may be compared. As a result, a third quantitative value (e.g., 50), which is the first quantitative value of the remaining quantitative value, of the plurality of quantitative values may be compared with the first epoch E1 for determining a difference D2. As shown in FIG. 4, the difference D2 may be determined to be "−40" (i.e., the difference between 50 and 90 is −40). In this example, the absolute value of the difference D2 is therefore "40," which is greater than the threshold "5". Thus, at step 312, the third quantitative value (e.g., 50) may be designated as the second epoch E2 (i.e., the next epoch). Corresponding to the third quantitative value "50", tuple 406 (tuple T3) may be created and T3={DV=0, Ep=50 (E2), t=$t_3$}.

In some embodiments, the comparison of the further quantitative values of the remaining quantitative values may be performed with the first epoch (e.g., E1=90) and with the second epoch (e.g., E2=50). For example, the next quantitative value (e.g., the fourth quantitative value "93") may be compared with the first epoch (e.g., 90) and the second epoch (e.g., 50). After comparison of the fourth quantitative value with the first epoch, a difference D3 (e.g., a first difference) may be determined to be "3" (i.e., the difference between 93 and 90 is 3). Further, after comparison with the second epoch, the difference D3 (e.g., the second difference) may be determined to be "43" (i.e., the difference between 93 and 50 is 43). Thus, as discussed above, in some embodiments, if the absolute value of the first difference (e.g., 3) is lesser than the threshold (e.g., 5) and lesser than the absolute value of the second difference (e.g., 43), the first difference (e.g., D3=3) may be stored as a delta value (DV) in a tuple 408 corresponding to the fourth quantitative value. In this example, the epoch for the fourth quantitative value may be stored as the first epoch E1 because the absolute value of the difference D3 is determined to be lesser than the threshold, after the comparison of the fourth quantitative value with the first epoch E1. As a result, the tuple 408 (i.e., tuple T4) may comprise the delta value as "3", the epoch as E1, and time stamp t as $t_4$.

Similarly, the next quantitative value (e.g., the fifth quantitative value "51") may be compared with the first epoch (e.g., 90) and the second epoch (e.g., 50). Based on the comparison, a difference D4 (e.g., a first difference) may be determined to be "−39" (i.e., the difference between 51 and 90 is −39). Further, after comparison of the fifth quantitative value with the second epoch, the difference D4 (e.g.; the second difference) may be determined as "1" (i.e., the difference between 51 and 50 is 1). As discussed above, in some embodiments, if an absolute value of the second difference (e.g., 1) is lesser than the threshold (e.g., 5) and lesser than an absolute value of the first difference (e.g., 39), the second difference (e.g., D4=1) may be stored as a delta value (DV) along with the second epoch E2 and the time stamp t as $t_5$ in a tuple T5 corresponding to the fifth quantitative value. In some embodiments, based on the minimal value of the absolute value of the first difference and the absolute value of the second difference, the first difference and the second difference may be stored as delta value in the tuple if both the absolute value of the first difference and the absolute value of the second difference are lesser than the threshold. For example, the tuple 410 (e.g., tuple T5) may comprise {DV=1, Ep=E2, t=$t_5$}. In the above example, the epoch for the fifth quantitative value is stored as E2 (i.e., the second epoch) because the absolute value of the difference D4 is determined to be lesser than the threshold based on the comparison of the fifth quantitative value with the second epoch E2.

Further, the sixth quantitative value (e.g., "5") may be compared with the first epoch (e.g., 90) and the second epoch (e.g., 50). Based on the comparison with the first epoch, a difference D5 (e.g., the first difference) may be determined as "−85" (i.e., the difference between 5 and 90 is −85). Similarly, based on comparison with the second epoch, the difference D5 (e.g., the second difference) may be determined as "−45" (i.e., the difference between 5 and 50 is −45). In this example, the absolute value of the first difference is "85" and the absolute value of the second difference is "45". Thus, as discusses above, in some embodiments, if the absolute value of the first difference (e.g., 85) and the absolute value of the second difference (e.g., 45) are both greater than the threshold (e.g., 5), the sixth quantitative value "5" may be designated (step 312) as a third epoch E3 (i.e., the next epoch). For the sixth quantitative value of "5", a tuple 412 may be created and the tuple 412 (i.e., tuple T6) may comprise {DV=0, Ep=5 (E3), t=$t_6$}. Thus, in this example, all the tuples from 402 to 412 (i.e., T1 through T6) may be stored in a database 316 as the plurality of tuples (as shown in FIG. 4). Also, the plurality of tuples may be further processed for optimizing the memory utilization in the database 316.

Figure 5:
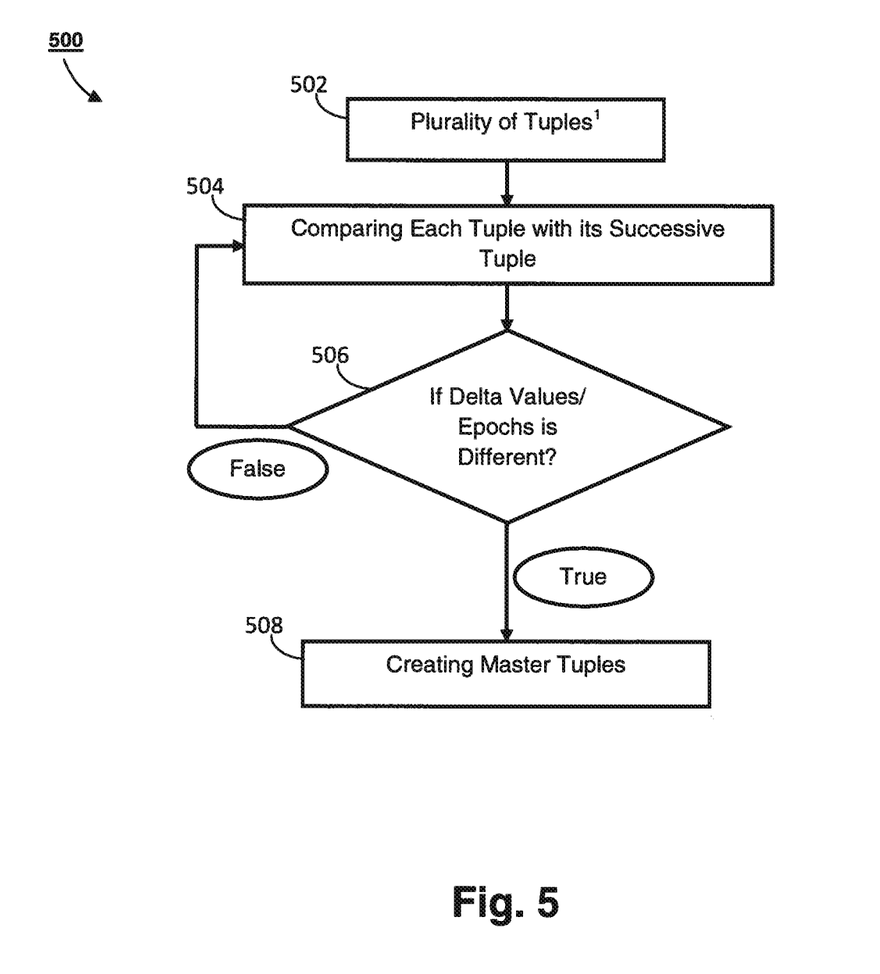
FIG. 5 is a flowchart illustrating an exemplary method for optimizing memory utilization in a database, in accordance with an embodiment of the present subject matter.
Figure 6:
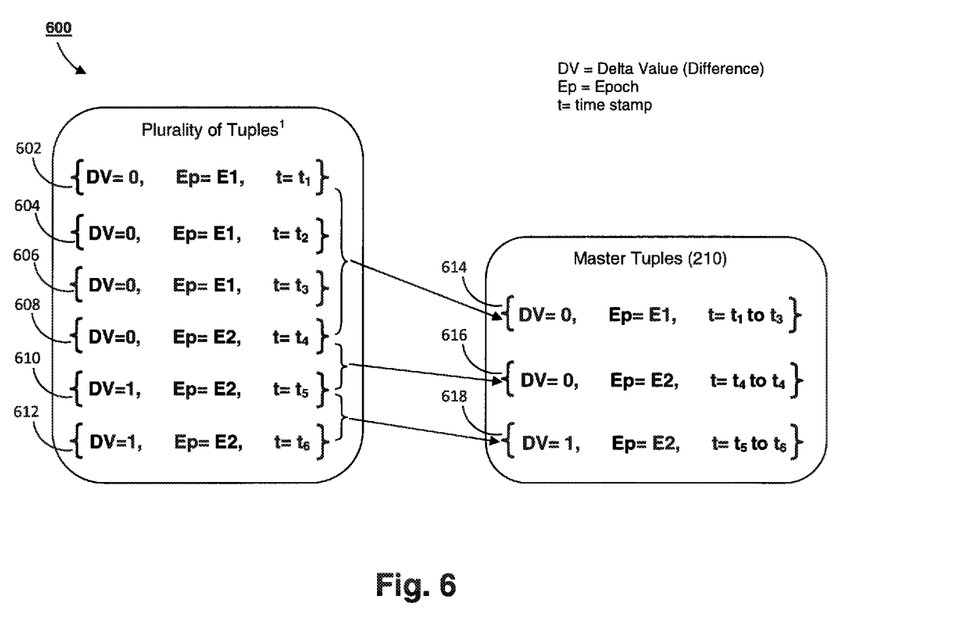
FIG. 6 is a diagram illustrating an exemplary operation of the system for optimizing memory utilization in a database, in accordance with an embodiment of the present subject matter.

FIG. 5 is a flowchart illustrating an exemplary method 500 for optimizing memory utilization in a database, in accordance with an embodiment of the present subject matter. FIG. 6 is a diagram 600 illustrating an exemplary operation of the system for optimizing memory utilization in a database, in accordance with an embodiment of the present subject matter. According to some embodiments of present subject matter, another set of plurality of tuples[1] is illustrated. As shown in FIG. 6, the plurality of tuples[1] may comprise tuples 602 through 612. Tuples 602 through 612 may be different from the plurality of tuples discussed in connection with FIG. 4. At step 502, the plurality of tuples[1] (e.g., tuples 602 to 612) may be provided for optimizing memory utilization of the database 316.

At step 504, the tuples may be compared in pairs to generate a master tuple corresponding to one or more tuples. Further, the master tuple may be generated by comparing the tuples in a sequential order such that the $n^{th}$ tuple is compared with the subsequent tuples in a sequential manner (e.g., compared with the $(n+1)^{th}$ tuple and so forth). As a result, for the plurality of tuples[1] shown in FIG. 6, each tuple may be compared with its successive tuple. For example, tuple 602 may be compared with tuple 604, tuple 604 may be compared with tuple 606, tuple 606 may be compared with tuple 608, tuple 608 may be compared with tuple 610, and tuple 610 may be compared with tuple 612.

At step 506, in some embodiments, the conditions specified may be verified for creating the master tuple. For example, the master tuple may be created if any one of the following conditions can be satisfied based on the comparison of the tuples in pairs: if the delta values are the same and epochs are different (referred to hereinafter as condition 1); if the delta values are different and the epochs are the same (referred to hereinafter as condition 2); or if the delta values are different and the epochs are different (referred to hereinafter as condition 3).

As an example, referring to FIG. 6, if the tuple 602 is compared with the tuple 604, no difference may be found between the delta values and the epochs. Thus, the comparison may move to the subsequent tuples sequentially. The tuple 602 and the tuple 606 may then be compared. Again, no difference may be determined between the delta values and the epochs based on the comparison of the tuples 602 and 606. Further, the tuples 602 and 608 may be compared. Based on the comparison of tuples 602 and 608, it may be determined that the delta values are the same but the epoch values are different (i.e., corresponding to condition 1 as discussed above). Thus, at step 508, a master tuple 614 may be created and the master tuple 614 may comprise a delta value (DV) as 0, an epoch as E1, and a time stamp t as $t_1$ to $t_3$. As a result, in the master tuple 614, information related to the tuples 602 to 606 are stored.

In the next step, the tuples 608 and 610 may be compared. Based on the comparison, it may be determined that the delta values are different but the epochs are the same (i.e., corresponding to condition 2 as discussed above). Thus, at step 508, a master tuple 616 may be created and the master tuple 616 may comprise a delta value as 0, an epoch as E2, and a time stamp t as $t_4$ to $t_4$. Further, the tuple 610 and the tuple 612 may be compared. Based on the comparison, no difference may be determined between the delta values and the epochs. Thus, a master tuple 618 may be created and the master tuple 618 may comprise a delta value as 1, an epoch as E2, and a time stamp t as $t_5$ to $t_6$. As a result, corresponding to the six tuples 602 to 612, three master tuples (614 to 618) may be created and stored in the database 316. In such a manner, the system 102 may be enabled to optimize the memory utilization of the database 316.

Some embodiments of present subject matter may enable the system 102 and the method to reduce the space limitation situation in a database by avoiding the storing of repeated values in the database. Some embodiments of present subject matter may enable the system 102 and the method to optimize memory utilization of the database.

Figure 7:
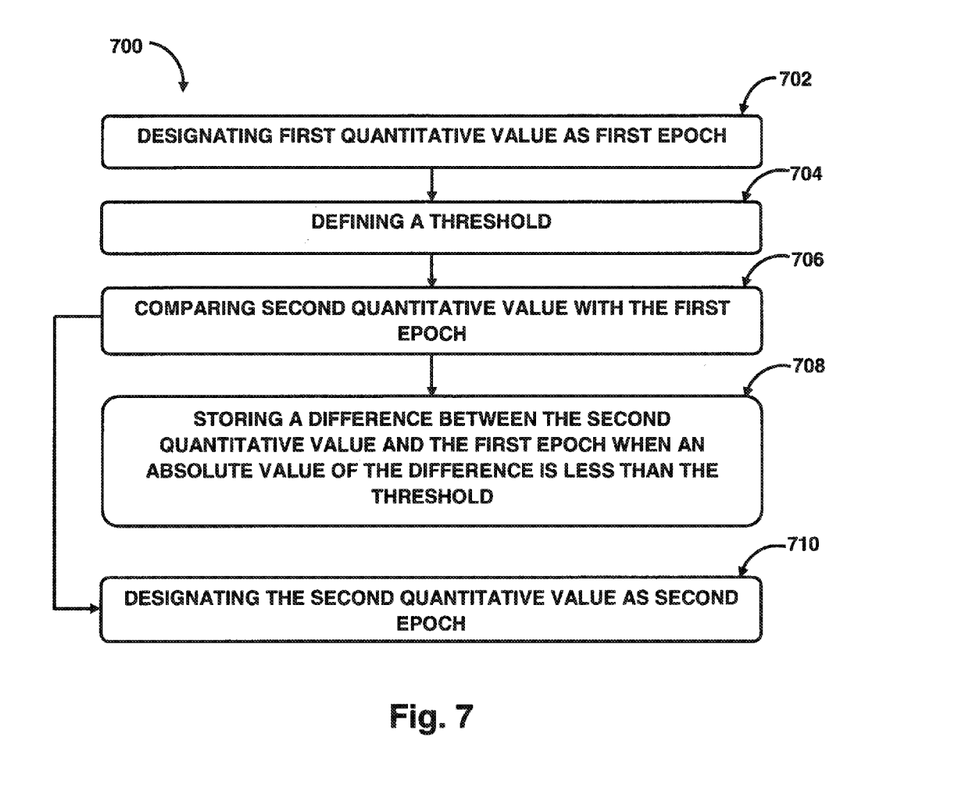
FIG. 7 illustrates an exemplary method for optimizing memory utilization in a database that is capable of storing a plurality of quantitative values, in accordance with an embodiment of the present subject matter.

FIG. 7 is a flowchart illustrating an exemplary method 700 for optimizing memory utilization in a database that is capable of storing a plurality of quantitative values, in accordance with an embodiment of the present subject matter. The method 700 may be described in the general context of computer executable instructions. Generally, computer executable instructions may include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices.

The order in which the method 700 is described is not intended to be construed as a limitation, and any steps of the described method may be combined in any order to implement the method 700 or alternate methods. Additionally, individual steps may be deleted from the method 700 without departing from the spirit and scope of the subject matter described herein. Furthermore, the method may be implemented in any suitable hardware, software, firmware, or combination thereof. However, for ease of explanation, in the embodiments described below, the method 700 may be considered to be implemented in the above described system 102.

At step 702, a first quantitative value of the plurality of quantitative values may be designated as a first epoch. The plurality of quantitative values may be associated with a plurality of tuples in such manner that each quantitative value has a corresponding tuple. Further, each of the plurality of tuples may comprise a delta value, an epoch, and a time stamp.

At step 704, a threshold may be defined for a second quantitative value of the plurality of quantitative values.

At step 706, the second quantitative value may be compared with the first epoch to determine a difference between the second quantitative value and the first epoch.

At step 708, the difference determined between the second quantitative value and the first epoch may be stored when an absolute value of the difference is less than the threshold. Further, the difference may be stored as a delta value (DV) in a tuple corresponding to the second quantitative value.

At step 710, the second quantitative value may be designated as a second epoch when the absolute value of the difference is determined to be equal to or greater than the threshold.

Figure 8:
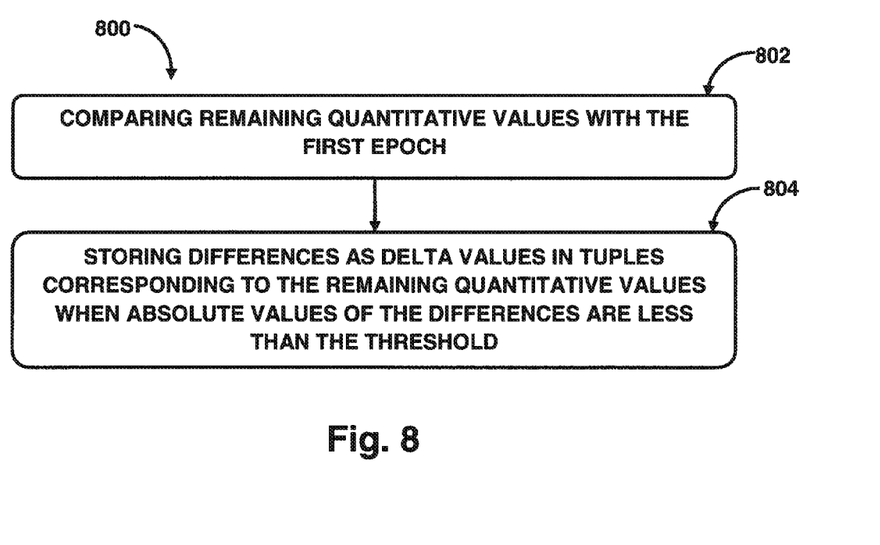
FIG. 8 illustrates an exemplary method for comparing remaining quantitative values, in accordance with one embodiment of the present subject matter.

FIG. 8 is a flowchart illustrating an exemplary method 800 for comparing the remaining quantitative values based on, for example, step 708 as shown in FIG. 7, in accordance with an embodiment of the present subject matter.

At step 802, the remaining quantitative values may be compared with the first epoch to determine differences D2 to Dn. A difference Dn may be an indication of a variation between the nth quantitative value and the first epoch. Further, the remaining quantitative values may exclude the first quantitative value and the second quantitative value.

At step 804, the differences D2 to Dn may be stored as delta values in tuples corresponding to the remaining quantitative values when absolute values of the differences D2 to Dn are less than the threshold.

Figure 9:
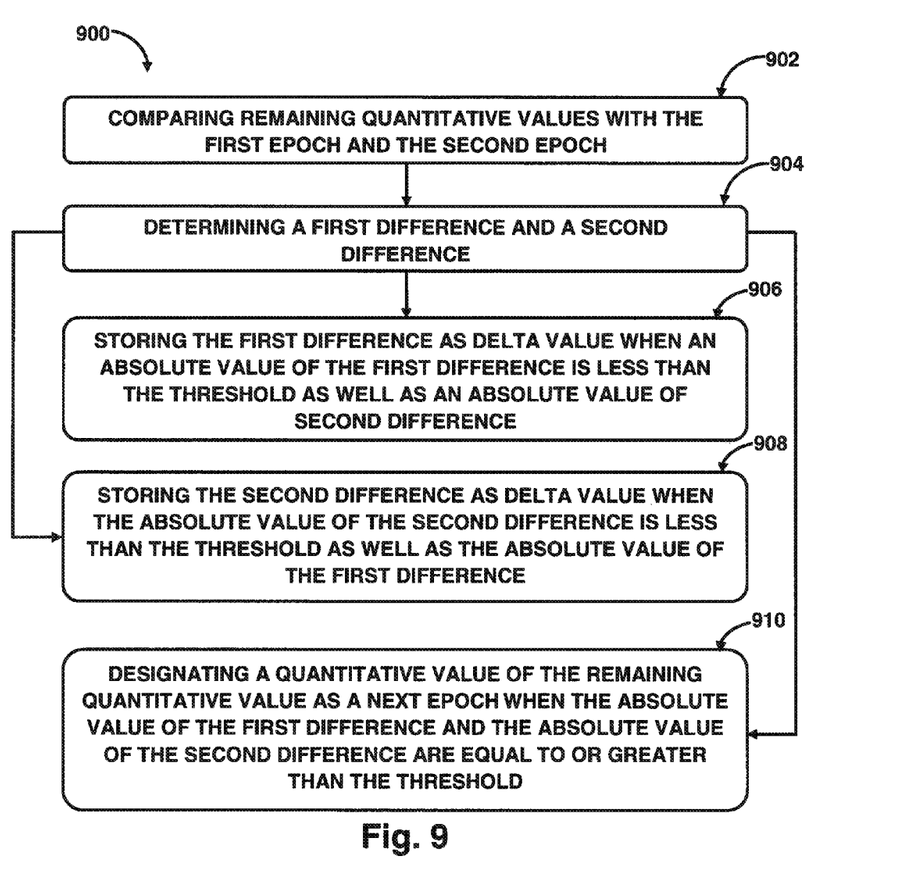
FIG. 9 illustrates an exemplary method for comparing remaining quantitative values, in accordance with another embodiment of the present subject matter.

FIG. 9 is a flowchart illustrating an exemplary method 900 for comparing remaining quantitative values based on, for example, step 710 as shown in FIG. 7, in accordance with an embodiment of the present subject matter.

At step 902, the remaining quantitative values may be compared with the first epoch and the second epoch. Further, the remaining quantitative values may exclude the first quantitative value and the second quantitative value.

At step 904, based on the comparison, a first difference and a second difference may be determined. The first difference may correspond to a difference between each of the remaining quantitative values and the first epoch and the second difference may correspond to a difference between each of the remaining quantitative values and the second epoch.

At step 906, the first difference may be stored as a delta value if an absolute value of the first difference is less than the threshold and less than an absolute value of the second difference. Further, the first difference may be stored as the delta value in a tuple Tn corresponding to a quantitative value Qn of the remaining quantitative values.

At step 908, the second difference may be stored as a delta value if the absolute value of the second difference is less than the threshold and less than the absolute value of the first difference. Further, the second difference may be stored as the delta value in a tuple Tn corresponding to a quantitative value Qn of the remaining quantitative values.

At step 910, a quantitative value of the remaining quantitative values may be designated as a next epoch if the absolute value of the first difference and the absolute value of the second difference are equal to or greater than the threshold.

Further, after storing the delta values in the plurality of tuples (e.g., "n" number of tuples) based on the comparison performed at the steps 706, 802, and 902, the plurality of tuples may be further processed for optimizing the memory utilization of the database 316. For optimizing the memory utilization, the tuples may be compared in sequence to generate a master tuple 210. The master tuple 210 may be generated by comparing the tuples in a sequential order such that the $n^{th}$ tuple is compared with the $(n+1)^{th}$ tuple of the plurality of tuples. The detail explanation of the creation of master tuples 210 is described in connection with FIGS. 5 and 6 by using a plurality of tuples$_1$ as an example, according to an embodiment of present subject matter. As shown in FIG. 6, the plurality of tuples$_1$ may comprise six tuples 602 to 612. For the six tuples 602 to 612, three master tuples (tuples 614 to 618) may be created and stored in the database 316. Further, after the master tuples 210 are created and stored in the database 316, the plurality of tuple may be deleted from the database 316. Thus, in such a manner, the system 102 may be enabled to optimize the memory utilization of the database 316 by avoiding the storing of repeated values in the master tuples 210.

Although implementations for methods and systems for optimizing memory utilization in a database capable of storing a plurality of quantitative values have been described in language specific to structural features and/or methods, it is appreciated that the appended claims are not necessarily limited to the specific features or methods described. Rather, the specific features and methods are disclosed as examples of implementations for optimizing memory utilization in the database.

I claim:

1. A method for optimizing memory utilization in a database capable of storing a plurality of quantitative values, the method comprising:
   designating, by one or more processors executing programmed instructions stored in a memory, a first quantitative value of the plurality of quantitative values as a first epoch associated with a first tuple, wherein the first tuple comprises a first delta value;
   determining, by the one or more processors, a first difference between a second quantitative value of the plurality of quantitative values and the first epoch;
   storing, by the one or more processors, the first difference as a second delta value associated with a second tuple when an absolute value of the first difference is less than a threshold, the second tuple corresponding to the second quantitative value;
   designating the second quantitative value as a second epoch associated with the second tuple when the absolute value of the first difference is greater than or equal to the threshold; and
   generating a master tuple based on the first tuple and the second tuple, wherein the master tuple being used to optimize the memory utilization in the database.

2. The method of claim 1, wherein the plurality of quantitative values are associated with a plurality of tuples comprising at least the first tuple and the second tuple, each of the plurality of quantitative values being associated with a corresponding tuple of the plurality of tuples, and each of the plurality of tuples comprises delta value, an epoch, and a time stamp.

3. The method of claim 1, further comprising:
   determining a plurality of differences based on remaining quantitative values of the plurality of quantitative values and the first epoch when the absolute value of the first difference is less than the threshold,
      wherein the plurality of differences comprises at least a second difference, wherein at least one of the plurality of differences represents a variation between the corresponding quantitative value and the first epoch, and wherein the remaining quantitative values are separate from the first quantitative value and the second quantitative value; and
   storing the plurality of differences as delta values associated with corresponding plurality of tuples if absolute values of the plurality of differences are less than the threshold, wherein the plurality of tuples corresponds to the remaining quantitative values.

4. The method of claim 1, further comprising:
   determining one or more first remaining differences based on the remaining quantitative values of the plurality of quantitative values and the first epoch when the absolute value of the first difference is greater than or equal to the threshold, the remaining quantitative values being separate from the first quantitative value and the second quantitative value;
   determining one or more second remaining differences based on the remaining quantitative values of the plurality of quantitative values and the second epoch;
   storing the first remaining differences as delta values in corresponding remaining tuples of a plurality of tuples when absolute values of the first remaining differences are less than the threshold and are less than absolute values of the corresponding second remaining difference, the remaining tuples corresponding to the remaining quantitative values and the plurality of tuples comprising the first tuple, the second tuple, and the remaining tuples;
   storing the second remaining differences as delta values in corresponding remaining tuples of the plurality of tuples if the absolute values of the second remaining differences are less than the threshold and are less than the absolute values of the corresponding first remaining differences; and designating a third quantitative value of the remaining quantitative values as a third epoch when the absolute values of the first remaining differences and the absolute values of the second remaining differences are equal to or greater than the threshold.

5. The method of claim 1, wherein generating the master tuple comprises comparing two or more tuples of the plurality of tuples in a sequential order, the plurality of tuples comprising at least the first tuple and the second tuple.

6. The method of claim 5, further comprising generating one or more additional master tuples based on a plurality of tuples, the plurality of tuples comprising the first tuple, the second tuple, and the one or more additional tuples.

7. The method of claim 5, wherein the master tuple is generated when:
the first delta value and the second delta value are the same and the first epoch and the second epoch are different,
the first delta value and the second delta value are different and the first epoch and the second epoch are the same, or
the first delta value and the second delta value are different and the first epoch and the second epoch are different.

8. The method of claim 6, wherein the one or more additional master tuples are generated based on comparisons of delta values and comparison of epochs in corresponding tuples.

9. A system for optimizing memory utilization in a database capable of storing a plurality of quantitative values, the system comprising:
one or more processors; and
a memory storing processor-executable instructions that, when executed by the one or more processors, configure the one or more processors to:
designate a first quantitative value of the plurality of quantitative values as a first epoch associated with a first tuple, wherein the first tuple comprises a first delta value;
determine a first difference between a second quantitative value of the plurality of quantitative values and the first epoch;
store the first difference as a second delta value associated with a second tuple when an absolute value of the first difference is less than a threshold, the second tuple corresponding to the second quantitative value;
designate the second quantitative value as a second epoch associated with the second tuple when the absolute value of the first difference is greater than or equal to the threshold; and
generate a master tuple based on the first tuple and the second tuple, wherein the master tuple being used to optimize the memory in the database.

10. The system of claim 9, wherein the plurality of quantitative values are associated with a plurality of tuples comprising at least the first tuple and the second tuple, each of the plurality of quantitative values being associated with a corresponding tuple of the plurality of tuples, and each of the plurality of tuples comprises delta value, an epoch, and a time stamp.

11. The system of claim 9, further comprising instructions to configure the one or more processors to:
determine a plurality of differences based on remaining quantitative values of the plurality of quantitative values and the first epoch when the absolute value of the first difference is less than the threshold,
wherein the plurality of differences comprises at least a second difference, wherein at least one of the plurality of differences represents a variation between the corresponding quantitative value and the first epoch, and
wherein the remaining quantitative values are separate from the first quantitative value and the second quantitative value; and
store the plurality of differences as delta values associated with corresponding plurality of tuples if absolute values of the plurality of differences are less than the threshold, wherein the plurality of tuples corresponds to the remaining quantitative values.

12. The system of claim 9, further comprising instructions to configure the one or more processors to:
determine one or more first remaining differences based on the remaining quantitative values of the plurality of quantitative values and the first epoch when the absolute value of the first difference is greater than or equal to the threshold, the remaining quantitative values being separate from the first quantitative value and the second quantitative value;
determine one or more second remaining differences based on the remaining quantitative values of the plurality of quantitative values and the second epoch;
store the first remaining differences as delta values in corresponding remaining tuples of a plurality of tuples when absolute values of the first remaining differences are less than the threshold and are less than absolute values of the corresponding second remaining difference, the remaining tuples corresponding to the remaining quantitative values and the plurality of tuples comprising the first tuple, the second tuple, and the remaining tuples;
store the second remaining differences as delta values in corresponding remaining tuples of the plurality of tuples if the absolute values of the second remaining differences are less than the threshold and are less than the absolute values of the corresponding first remaining differences; and
designate a third quantitative value of the remaining quantitative values as a third epoch when the absolute values of the first remaining differences and the absolute values of the second remaining differences are equal to or greater than the threshold.

13. The system of claim 9, wherein the instructions to generate the master tuple comprises instructions to compare two or more tuples of the plurality of tuples in a sequential order, the plurality of tuples comprising at least the first tuple and the second tuple.

14. The system of claim 13, further comprising instructions to configure the one or more processors to generate one or more additional master tuples based on a plurality of tuples, the plurality of tuples comprising the first tuple, the second tuple, and the one or more additional master tuples.

15. The system of claim 13, wherein the master tuple is generated when:
the first delta value and the second delta value are the same and the first epoch and the second epoch are different,
the first delta value and the second delta value are different and the first epoch and the second epoch are the same, or
the first delta value and the second delta value are different and the first epoch and the second epoch are different.

16. The system of claim 14, wherein the one or more additional master tuples are generated based on comparisons of delta values and comparison of epochs in corresponding tuples.

17. A non-transitory computer program product having embodied thereon computer program instructions for optimizing memory utilization in a database capable of storing a plurality of quantitative values, the computer program instructions comprising instructions for configuring a processor to perform operations comprising:

designating a first quantitative value of the plurality of quantitative values as a first epoch associated with a first tuple, wherein the first tuple comprises a first delta value;

determining a first difference between a second quantitative value of the plurality of quantitative values and the first epoch;

storing the first difference as a second delta value associated with a second tuple when an absolute value of the first difference is less than a threshold, the second tuple corresponding to the second quantitative value;

designating the second quantitative value as a second epoch associated with the second tuple when the absolute value of the first difference is greater than or equal to the threshold; and     generating a master tuple based on the first tuple and the second tuple, wherein the master tuple being used to optimize the memory utilization in the database.

\* \* \* \* \*